United States Patent Office 3,205,384
Patented Sept. 7, 1965

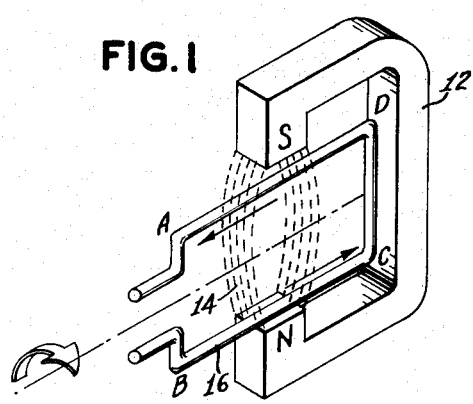
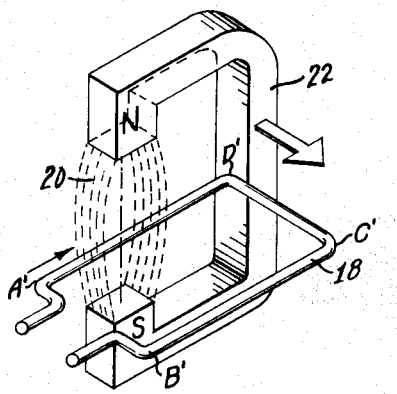
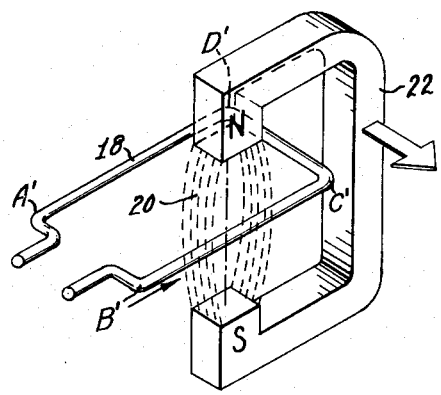
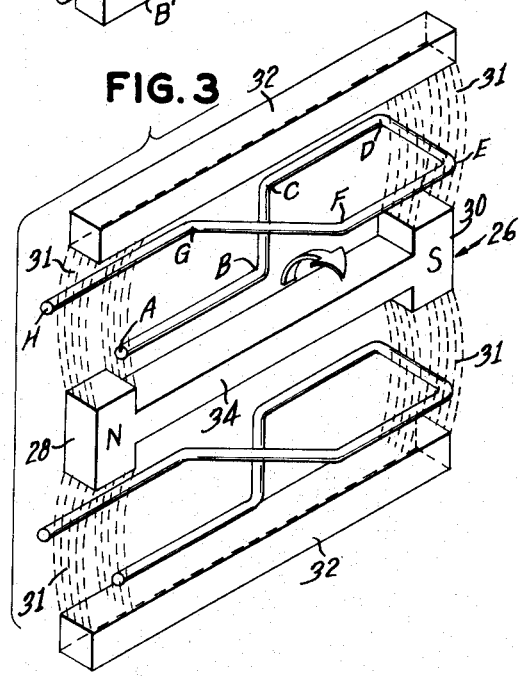
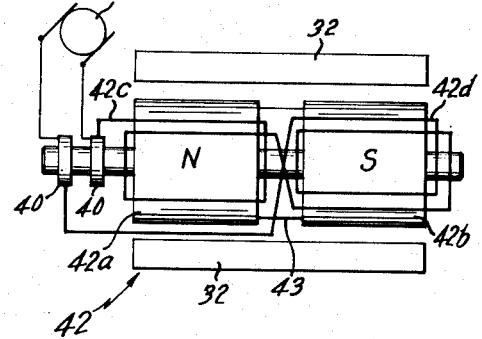
INVENTOR.
ANTHONY SEARS
ATTORNEY

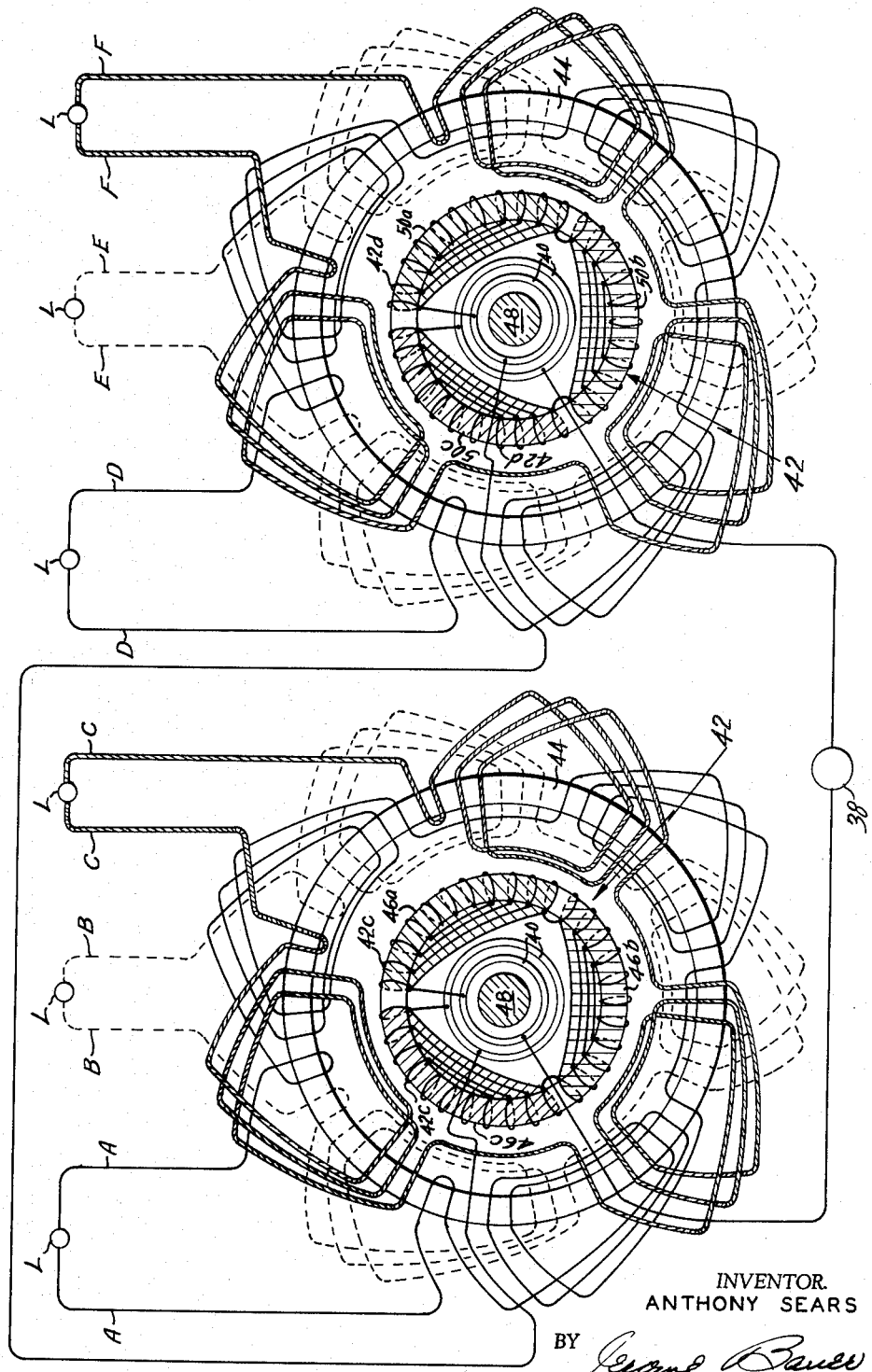

3,205,384
HOMOPOLAR GENERATOR
Anthony Sears, 1061 St. Nicholas Ave., New York, N.Y.
Filed Jan. 14, 1963, Ser. No. 251,397
14 Claims. (Cl. 310—168)

The present invention relates to an electrical generator and in particular to a homopolar type generator.

In a conventional generator, each of the field magnets carried by the rotor has its own north and south poles displaced transversely to the axis of rotation. In the present invention, the magnetic poles are disposed side by side on the rotor, thereby providing for the north and the south pole elements each to be in lengthwise or axial relationship with the other. Thus, each north and south element on the rotor is a lengthwise-directed, peripherally-extending pole.

The use of homopolar or unipolar induction generators is well known in the prior art, as is the employment of half twist coils. However, in prior devices, half twist coils were used solely to connect conventional armatures, i.e., armatures having a north side and a south side that are in a tandem, side-by-side, rotative relationship.

Because of the ability of this invention to sharply reduce the speed of the rotor, the centrifugal forces normally applied to larger rotors are significantly diminished in the present invention. The reduced speed of rotation of the rotor, while producing the same frequency as the conventional generator, allows the rotor driving unit, such as a steam turbine, to utilize large ratio reduction gears and thereby effect a gain in horsepower or to use a smaller or lower speed driving engine.

It is therefore an object of the present invention to provide an electrical generator which for a given rotational speed produces a greater output frequency than prior devices.

It is a further object of this invention to provide a generator that can utilize any number of pole heads or projections including an odd numbered polar projection arrangement.

Other and further objects of this invention reside in the structures and arrangements hereinafter more fully described with reference to the accompanying drawings in which:

FIG. 1 shows pictorially a simple, one turn version of a conventional generator, FIGS. 2A and 2B show pictorially the operation of the generator of this invention, FIG. 3 shows pictorially a two-pole generator of this invention employing half twist coils, FIG. 4 is a side elevation showing diagrammatically a typical winding for a rotor, FIG. 5 is an end view of a generator of this invention wherein the pole has four projections, FIG. 6 shows in a radial presentation the invention as embodied in a three-phase lap wound stator wherein the poles of the rotor have three heads or projection elements.

The E.M.F. of a generator is defined as a voltage induced in loops of wires revolving in such a way as to cut the lines or force of an encompassing magnetic field.

Considering now the structure of FIG. 1, magnet 12 produces a magnetic field 14 in which loop 16 is rotated. In FIG. 1, the side of the loop BC is shown moving clockwise across the lines of force 14. Thus, applying the well known Right Hand Rule, it will be found that the current will flow around the loop in the direction BCDA. To follow the Right Hand Rule, extend the Thumb, Forefinger and Middle Finger of the Right hand at right angles to one another. Let the Thumb point in the direction of the motion, the Forefinger in the direction of the magnetic flux; then the Middle Finger will be pointing in the direction of the induced electromotive force. When wire BC is at the top and is moving across the magnetic field, the induced E.M.F. will be reversed; that is, current flow will be from C to B. Likewise, the E.M.F. in wire AD will be reversed and will be from A to D. Thus, there will be a reversal in current.

The generator of this invention operates in a different and novel fashion. Coil 18 is passed transversely through field 20 generated by magnet 22 so that wire A'D' passes through the field, as shown in FIG. 2A. Applying the Right Hand Rule, it will be seen that a current will flow from A' to D'. However, as wire B'C' passes through the magnetic field, applying the same rule, it will be seen that the current flow will be B' to C', as shown in FIG. 2B. Accordingly, there is a reversal of current flow. If we were now to hold the turn or the loop stationary and transport a magnet past the loop, the electromotive force will achieve its maximum value when wire A'D' is directly under the magnet, and reach a minimum value when the coil is centered about the magnet, and again reaches a maximum value when wire B'C' is in the center of the magnetic field.

Referring now to FIG. 3, there is shown an axially related two-pole embodiment of the generator of this invention. The rotor 26 includes a magnetic structure having a north pole 28 and an axially related south pole 30, each of which is two-headed or has two projection elements. The flux paths 31 include a generator frame or stator 32 and a rotor structure 34.

Once again, if the Right Hand Rule is applied, it will be seen that there will be a flow of current from A to B and from C to D, as well as from E to F and G to H, as the rotor turns clockwise, as indicated by the appropriate arrow. The series connected coils are joined by a half twist turn; that is, B to C and G to F are joined so that there is continuous flow in the same direction through the loop to points AH as the field passes the stator winding, although the north and south poles simultaneously cut the same coil.

It is to be noted that as each element or head of the north pole passes the turn, the flux linking the turn is growing. As it moves away from the turn, the flux is decreasing. Accordingly, when several north pole heads or projection elements are rotated past the coil in succession, the interlinked flux undulates, thereby generating an alternating voltage even though it does not change direction itself. Or, interestingly, the frequency of the generated current in the embodiment of FIG. 3 is double or twice that which would be obtained at the same speed if the poles were alternately rotated north and south as in a conventional generator. Thus, the apparatus of this invention can produce an alternating current at twice the frequency for a given rotational speed as a conventional generator.

FIG. 4 shows a unitary rotor generally identified by the numeral 42 of a homopolar generator in which the rotor is a single element having two distinct, axially related poles, one a north 42a and the other a south 42b. Because the rotor 42 is unitary in construction, the two poles 42a and 42b are on opposite sides of each other along the length thereof and rotate simultaneously. A circular peripheral slot or groove 43 shown in FIG. 4 serves as a graphic separation of the two poles from each other. However, the purpose of such slot 43 is to accommodate the illustrated half-twists of the exciter electromagnetic coils of the windings 42c and 42d that are diagrammatically shown positioned within the confines of the rotor 42. This enables the peripheral surfaces of the north-south poles 42a and 42b to be positioned as close as possible to the surrounding stator (not shown). When the rotor poles are slotted, the exciter windings 42c and 42d may be distributed and energized from a power supply 38 through slip rings 40, as shown. Those skilled in the art will recognize that the rotor 42 need not be externally excited to provide the north-south poles if it is a permanent magnet.

An interesting advantage of the present invention is that an odd number as well as an even number of pole projection elements or heads may be employed as illustrated in FIG. 5. There the rotor 33 is shown to include four north pole projection elements or heads 35, each of which is axially or longitudinally spaced in alignment with but from a similar plurality of four south pole projection elements or heads (not shown). When the pole heads 35 are shaped as shown in FIG. 5, they may be energized by concentrated windings 35a connected with an exciter 38 for rotation within the stator 37 having the three-phase windings 39. The even-numbered, four-headed pole arrangement of FIG. 5 generates a 60 cycle alternating current at one-half the rotational speed of a conventional generator or at 900 revolutions per minute.

In order to further clarify the invention, FIG. 6 illustrates an odd number or a three-element rotor 42 of the type shown in FIG. 4, but wherein the field coils 42c about each north pole head and 42d about each south pole head is in the form of a distributed winding. The winding 42c is energized from the power supply 38 through slip rings 40 provided at the north-south ends of the rotor. Thus, in FIG. 6 the three or odd number element or headed axially related north-south pole combination provides a generator which produces an output of 60 cycles at a rotor speed of only 1200 r.p.m. Although any number of phases may be provided, the embodiment of FIG. 6 illustrates a three-phase or polyphase arrangement provided on the stationary laminated stator 44.

The stator windings may have a one-half twist, one part of which is in the path of the magnetic field produced by the north pole, and the other half of which is in the path of the magnetic field produced by the south pole of the rotor. The half twist windings will conduct current in the same direction as illustrated in FIG. 3, so that the movement of electrons induced therein by the north and south poles of the rotor will not buck each other. If it is desired, all of the windings of the separate and independent first, second and third phases A, B and C in the path of the magnetic field of the north pole of the rotor can be made in the same direction. All the separate and independent phases D, E and F in the path of the magnetic field of the south pole of the rotor can be made in the same direction. Thereafter, the leadout wires of each phase may be connected to a load L in a circuit external to and beyond the stator 44 to provide a plurality of phases of a multi-phase current output, as illustrated in FIG. 6. If desired, the connection wires A, B and C of the north pole phases of the stator also may be crossed to connect in a star or delta arrangement with selected ones of the leadout or connection wires D, E and F of the south pole phases to make whatever phase connections the user may wish to make in a circuit external to the stator.

The north pole heads or projection elements 46a, 46b and 46c, shaded in FIG. 6 for illustration purposes only, are rotated by the shaft 48 unitarily with their axially aligned south pole heads 50a, 50b and 50c. The rotor and stator structures are preferably laminated, such as is commonly done in the art. Conventional brushes, slip rings and an exciter may be utilized in the present invention. Many other suitable winding forms commonly employed in the motor and generator industry may be employed for this purpose, such as bank-wound and wave-wound windings. Accordingly, no limitation is intended by the showing of the particular winding form of FIG. 6. Further, it is immaterial whether the rotor or stator windings are concentrated as illustrated in FIG. 5 or half-twist and distributed as illustrated in FIG. 4.

In the present invention, the north and south poles are axially related with each other along the length of the rotor, so that the magnetic lines of force or magnetic flux is transmitted from about the perimeter of the north length, and from about the perimeter of the south length of the rotor, between the windings of the stator. The number of sets of windings of the stator correspond to the number of pole elements or heads in the north and south pole portions of the rotor. Thus, if there are two pole heads on the north side of the rotor, there will also be two on the south side, each axially aligned with a respective one on the north side to form a plurality or two sets of heads and, in like manner, there will be an equal or corresponding number of windings on the stator. However, the stator can have a single phase or polyphase windings.

Hence, the present invention teaches the utilization of an induction type homopolar rotor having windings on the heads or projection elements of the axially related north-south poles defined on the rotor. The rotor can have any number of heads or projection elements and operates within a standard or conventional alternating current, single or polyphase stator.

While there have been shown and described and pointed out the fundamental novel features of the invention as applied to several preferred embodiments thereof, it will be understood that various omissions and substitutions and changes in the form and details of these devices illustrated and in their operations may be made by those skilled in the art, without departing from the spirit of the invention. It is the intention, therefore, to be limited only as indicated by the scope of the claims appended hereto.

I claim:

1. In a homopolar generator, a stator, a rotor having a north pole and a south pole each of which is axially related with the other for simultaneous rotation within said stator, said stator having a winding in the path of the magnetic field produced by said north and south poles, and said winding being wound to conduct current induced therein by said north pole to flow in the same direction as current induced therein by said south pole during the rotation of said rotor.

2. In a homopolar generator as in claim 1, said winding having two parts one of which is in the path of said magnetic field produced by said north pole and the other of which is in the path of said magnetic field produced by said south pole, said parts being wound on said stator and connected with each other by a half twist.

3. In a homopolar generator as in claim 1, said winding being in two parts, one of said parts being in the path of the magnetic field produced by said north pole and the other of said parts being in the path of said magnetic field produced by said south pole, and each of said parts being connected with the other in crossed relationship in an external circuit beyond said stator.

4. In a homopolar generator, a north magnetic pole, a south magnetic pole, said magnetic poles each being connected with the other to form axially related lengthwise extending peripheral portions of a rotor, a structure disposed about said rotor, said structure and rotor being rotatable relative to each other, and said structure having at least a winding in which a current is induced therein simultaneously by the magnetic fields of said north and south poles during the relative rotation of said structure and rotor.

5. In a homopolar generator as in claim 4, at least a field coil winding on said north and south magnetic poles, a source of electrical energy, and means connecting said field coil winding with said source of electrical energy.

6. In a homopolar generator as in claim 5, said field coil winding being wound with a half twist between said axially related north and south magnetic poles.

7. In a homopolar generator, a stationary structure having a plurality of windings, a rotor having a north magnetic pole and a south magnetic pole each axially related with the other along the length of the rotor for simultaneous rotation with said rotor in said stationary structure, said plurality of windings each having a current induced therein by the magnetic fields of the rotating north and south magnetic poles, each one of said plurality of windings in which a current is induced therein by said north magnetic pole is connected with a selected one of each of said plurality of windings in which current is induced therein by said south magnetic pole, said connected windings conducting the current induced therein by said north and south magnetic poles to flow in the same direction, and each of said selectively connected windings providing a phase of a multi-phase current output.

8. In a homopolar generator as in claim 7, field coil windings on said north and south magnetic poles, a source of electrical energy, and means connecting said field coil windings with said source of electrical energy.

9. In a homopolar generator as in claim 8, said field coil windings being wound with a half twist between said axially aligned north-south magnetic poles.

10. In a homopolar generator, a rotor having north and south magnetic poles axially aligned thereon for simultaneous rotation therewith and with each other, each of said north and south magnetic poles having a plurality of elements spaced about their respective peripheries, each one of said elements of said north magnetic pole being axially aligned with a respective one of said elements of said south magnetic pole to form a plurality of sets of north-south elements, a stator in which said rotor rotates, a plurality of windings on said stator one for each one of said elements of said sets, each winding having a current induced therein simultaneously by said axially aligned sets of elements of said rotating north and south magnetic poles, said windings in which a current is induced therein simultaneously by each one of said aligned north-south elements of a set being connected together to conduct said induced current to flow in the same direction.

11. In a homopolar generator as in claim 10, said north and south magnetic poles each having an odd number of elements.

12. In a homopolar generator as in claim 10, field coil windings on said elements of said north and south magnetic poles, a source of electrical energy, and means connecting said field coil windings with said source of electrical energy.

13. In a homopolar generator as in claim 12, said field coil windings being wound with a half twist between a set of said axially aligned north-south elements.

14. A homopolar generator comprising a rotor, lengthwise extending axially aligned north and south poles on said rotor, each of said poles having a corresponding plurality of magnetic elements axially aligned with each other, each one of said plurality of north magnetic elements axially aligned with a corresponding one of said plurality of south magnetic elements forming a plurality of sets of simultaneously rotating elements, a stator in which said rotor rotates, a plurality of windings corresponding in number to each of said sets of magnetic elements, each of said plurality of windings including a plurality of phase windings to produce a multi-phase current output, said windings being wound on said stator to conduct current induced therein simultaneously by a set of axially aligned rotating north-south elements to flow in the same direction, field coil windings on said rotor about said north-south elements to produce a magnetic field between said elements and said stator, a source of electrical energy, and means connecting said field coil windings with said source of electrical energy.

References Cited by the Examiner

Timbie and Bush: "Principles of Electrical Engineering," page 506, 3rd edition, John Wiley & Sons, 1942.

Pender: "Direct Current Machinery," page 248, John Wiley & Sons, 1928.

ORIS L. RADER, *Primary Examiner.*

MILTON O. HIRSHFIELD, *Examiner.*